(12) United States Patent
Kanda (10) Patent No.: US 8,436,942 B2
(45) Date of Patent: May 7, 2013

(54) IMAGE PROCESSING APPARATUS AND IMAGE PROCESSING METHOD

(75) Inventor: Toshiyuki Kanda, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 13/097,421

(22) Filed: Apr. 29, 2011

(65) Prior Publication Data

US 2011/0279732 A1 Nov. 17, 2011

(30) Foreign Application Priority Data

May 12, 2010 (JP) .................................. 2010-110535

(51) Int. Cl.
*H04N 5/57* (2006.01)
(52) U.S. Cl.
USPC .......................................... 348/687; 348/571
(58) Field of Classification Search .................. 348/571, 348/687
See application file for complete search history.

(56) References Cited

U.S. PATENT DOCUMENTS

| | | | | |
|---|---|---|---|---|
| 5,734,369 A | * | 3/1998 | Priem et al. | 345/605 |
| 7,330,600 B2 | | 2/2008 | Nishida | |
| 2005/0248590 A1 | * | 11/2005 | Tian et al. | 345/660 |
| 2006/0187152 A1 | * | 8/2006 | Kanai et al. | 345/74.1 |
| 2006/0273999 A1 | * | 12/2006 | Yamazaki et al. | 345/81 |

FOREIGN PATENT DOCUMENTS

| | | |
|---|---|---|
| JP | 2004-320701 A | 11/2004 |
| JP | 2007-212593 A | 8/2007 |

* cited by examiner

*Primary Examiner* — Jefferey Harold
*Assistant Examiner* — Justin Sanders
(74) *Attorney, Agent, or Firm* — Fitzpatrick, Cella, Harper & Scinto

(57) ABSTRACT

An image processing apparatus for controlling brightness of an image to be output to a display unit includes a separation unit which separates an input image into images in a plurality of areas, and an entropy calculation unit which calculates, for the image in each area, entropy information on at least one of distribution of luminosity, character quantity, and motion quantity. In addition, a brightness control unit controls brightness for the image in each area so that a first reduction rate of brightness in an area of which entropy is relatively small is greater than a second reduction rate of brightness in an area of which entropy is relatively large.

10 Claims, 10 Drawing Sheets

|   | A | B | C | D | E | F |
|---|---|---|---|---|---|---|
| 1 | 0 | 0 | 0 | 0 | 0 | 0 |
| 2 | 0 | 0 | 0 | 0 | 10 | 4 |
| 3 | 4 | 2 | 0 | 4 | 16 | 6 |
| 4 | 18 | 6 | 0 | 14 | 20 | 6 |
| 5 | 18 | 8 | 8 | 18 | 20 | 12 |
| 6 | 14 | 16 | 16 | 16 | 16 | 16 |

FIG. 3E

|   | A | B | C | D | E | F |
|---|---|---|---|---|---|---|
| 1 | 0 | 0 | 0 | 0 | 0 | 0 |
| 2 | 0 | 0 | 0 | 0 | 50 | 20 |
| 3 | 20 | 10 | 0 | 20 | 80 | 30 |
| 4 | 90 | 30 | 0 | 70 | 100 | 30 |
| 5 | 90 | 40 | 40 | 90 | 100 | 60 |
| 6 | 70 | 80 | 80 | 80 | 80 | 80 |

| | A | B | C | D | E | F |
|---|---|---|---|---|---|---|
| 1 | 0 | 0 | 0 | 0 | 0 | 0 |
| 2 | 0 | 0 | 0 | 0 | 1 | 0 |
| 3 | 0 | 0 | 0 | 0 | 1 | 0 |
| 4 | 1 | 0 | 0 | 1 | 1 | 0 |
| 5 | 1 | 1 | 1 | 1 | 1 | 1 |
| 6 | 1 | 1 | 1 | 1 | 1 | 1 |

FIG. 5B

| | A | B | C | D | E | F |
|---|---|---|---|---|---|---|
| 1 | 0.7 | 0.6 | 0.7 | 0.8 | 0.9 | 0.8 |
| 2 | 0.8 | 0.7 | 0.8 | 0.9 | 1.0 | 0.9 |
| 3 | 0.9 | 0.8 | 0.8 | 0.9 | 1.0 | 0.9 |
| 4 | 1.0 | 0.9 | 0.9 | 1.0 | 1.0 | 0.9 |
| 5 | 1.0 | 1.0 | 1.0 | 1.0 | 1.0 | 1.0 |
| 6 | 1.0 | 1.0 | 1.0 | 1.0 | 1.0 | 1.0 |

|   | A | B | C | D | E | F |
|---|---|---|---|---|---|---|
| 1 | 60 | 60 | 0 | 0 | 0 | 0 |
| 2 | 50 | 50 | 0 | 0 | 0 | 0 |
| 3 | 10 | 50 | 0 | 0 | 0 | 0 |
| 4 | 70 | 50 | 0 | 0 | 0 | 0 |
| 5 | 50 | 70 | 50 | 70 | 60 | 70 |
| 6 | 70 | 70 | 60 | 70 | 60 | 70 |

FIG. 7C

|   | A | B | C | D | E | F |
|---|---|---|---|---|---|---|
| 1 | 1 | 1 | 0 | 0 | 0 | 0 |
| 2 | 1 | 1 | 0 | 0 | 0 | 0 |
| 3 | 0 | 1 | 0 | 0 | 0 | 0 |
| 4 | 1 | 1 | 0 | 0 | 0 | 0 |
| 5 | 1 | 1 | 1 | 1 | 1 | 1 |
| 6 | 1 | 1 | 1 | 1 | 1 | 1 |

FIG. 7D

|   | A | B | C | D | E | F |
|---|---|---|---|---|---|---|
| 1 | 1.0 | 1.0 | 0.9 | 0.8 | 0.7 | 0.6 |
| 2 | 1.0 | 1.0 | 0.9 | 0.8 | 0.7 | 0.7 |
| 3 | 0.9 | 1.0 | 0.9 | 0.8 | 0.8 | 0.8 |
| 4 | 1.0 | 1.0 | 0.9 | 0.9 | 0.9 | 0.9 |
| 5 | 1.0 | 1.0 | 1.0 | 1.0 | 1.0 | 1.0 |
| 6 | 1.0 | 1.0 | 1.0 | 1.0 | 1.0 | 1.0 |

FIG. 9A FRAME 1

FIG. 9B FRAME 2

FIG. 9C

|   | A | B | C | D | E | F |
|---|---|---|---|---|---|---|
| 1 | 20 | 10 | 10 | 20 | 10 | 10 |
| 2 | 10 | 0 | 10 | 10 | 10 | 10 |
| 3 | 0 | 40 | 40 | 0 | 80 | 60 |
| 4 | 10 | 40 | 40 | 20 | 80 | 60 |
| 5 | 50 | 80 | 100 | 0 | 0 | 0 |
| 6 | 50 | 80 | 90 | 10 | 10 | 20 |

FIG. 10A

|   | A | B | C | D | E | F |
|---|---|---|---|---|---|---|
| 1 | 0 | 0 | 0 | 0 | 0 | 0 |
| 2 | 0 | 0 | 0 | 0 | 0 | 0 |
| 3 | 0 | 1 | 1 | 0 | 1 | 1 |
| 4 | 0 | 1 | 1 | 0 | 1 | 1 |
| 5 | 1 | 1 | 1 | 0 | 0 | 0 |
| 6 | 1 | 1 | 1 | 1 | 0 | 0 |

FIG. 10B

|   | A | B | C | D | E | F |
|---|---|---|---|---|---|---|
| 1 | 0.7 | 0.8 | 0.8 | 0.7 | 0.8 | 0.8 |
| 2 | 0.8 | 0.9 | 0.9 | 0.8 | 0.9 | 0.9 |
| 3 | 0.9 | 1.0 | 1.0 | 0.9 | 1.0 | 1.0 |
| 4 | 0.9 | 1.0 | 1.0 | 0.9 | 1.0 | 1.0 |
| 5 | 1.0 | 1.0 | 1.0 | 0.9 | 0.9 | 0.9 |
| 6 | 1.0 | 1.0 | 1.0 | 1.0 | 0.9 | 0.8 |

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

A liquid crystal display, plasma display, organic EL display, and field emission type display among others are receiving attention as a display for an image display apparatus. Since an image display apparatus is often used for a long period of time, reducing power consumption is one important technical problem. Japanese Patent Application Laid-Open No. 2007-212593, for example, discloses a method for reducing power consumption of a display for displaying an advertisement while maintaining the advertising function by decreasing the brightness of LEDs in an area other than the character and graphic portions, or by skipping LEDs to be lit in an area to emit a same color.

The method disclosed in Japanese Patent Application Laid-Open No. 2007-212593 may be effective for a still image of which major portion is characters and graphics, such as the case of an advertisement, or a still image of which the layout is already known. However in a case of a general image, such as a TV image or a movie, it may be difficult to appropriately judge a portion of which brightness can be dropped, or an impression of the entire image may be changed considerably, and the quality of the display image may be considerably diminished. In particular, for a moving image of which image is constantly changing, it is difficult to apply the method of Japanese Patent Application Laid-Open No. 2007-212593.

SUMMARY OF THE INVENTION

With the foregoing in view, it is an object of the present invention to provide an image processing technology to reduce power consumption required for display, while maintaining quality of images. It is another object of the present invention to provide an image processing technology for suppressing loss of a critical portion of an image when brightness of the image is dropped to reduce power consumption required for display.

The present invention in its first aspect provides an image processing apparatus for controlling brightness of an image to be output to a display unit, including: a separation unit which separates an image of each frame into a plurality of areas; an entropy calculation unit which calculates, for each area, entropy of information on at least one of distribution of luminosity, character quantity and motion quantity; and a brightness control unit which controls brightness in each area so that a reduction rate of brightness in an area of which entropy is small is greater than a reduction rate of brightness in an area of which entropy is large.

The present invention in its second aspect provides an image processing method executed by an image processing apparatus for controlling brightness of an image to be output to a display unit, including the steps of: separating an image of each frame into a plurality of areas; calculating, for each area, entropy of information on at least one of distribution of luminosity, character quantity and motion quantity; and controlling brightness in each area so that a reduction rate of brightness in an area of which entropy is small is greater than a reduction rate of brightness in an area of which entropy is large.

According to the present invention, power consumption required for display can be reduced while maintaining quality of images. Furthermore, according to the present invention, loss of a critical portion of an image can be sufficiently suppressed when brightness of an image is dropped to reduce power consumption required for display.

Further features of the present invention will become apparent from the following description of exemplary embodiments with reference to the attached drawings.

DESCRIPTION OF THE EMBODIMENTS

The present invention relates to an image processing apparatus for controlling brightness of an image (including still image and moving image) and an image processing method executed in the image processing apparatus, and more particularly to reducing brightness of a portion (noncritical portion) of an image so as to reduce power consumption required for display. The present invention can be used for an image display apparatus (e.g. television apparatus, computer monitor, advertisement display) or can be mounted for an apparatus providing video signals to an image display apparatus (e.g. video regenerator, computer). Now an image display apparatus according to an example of the present invention will be described with reference to the drawings.

Figure 1:
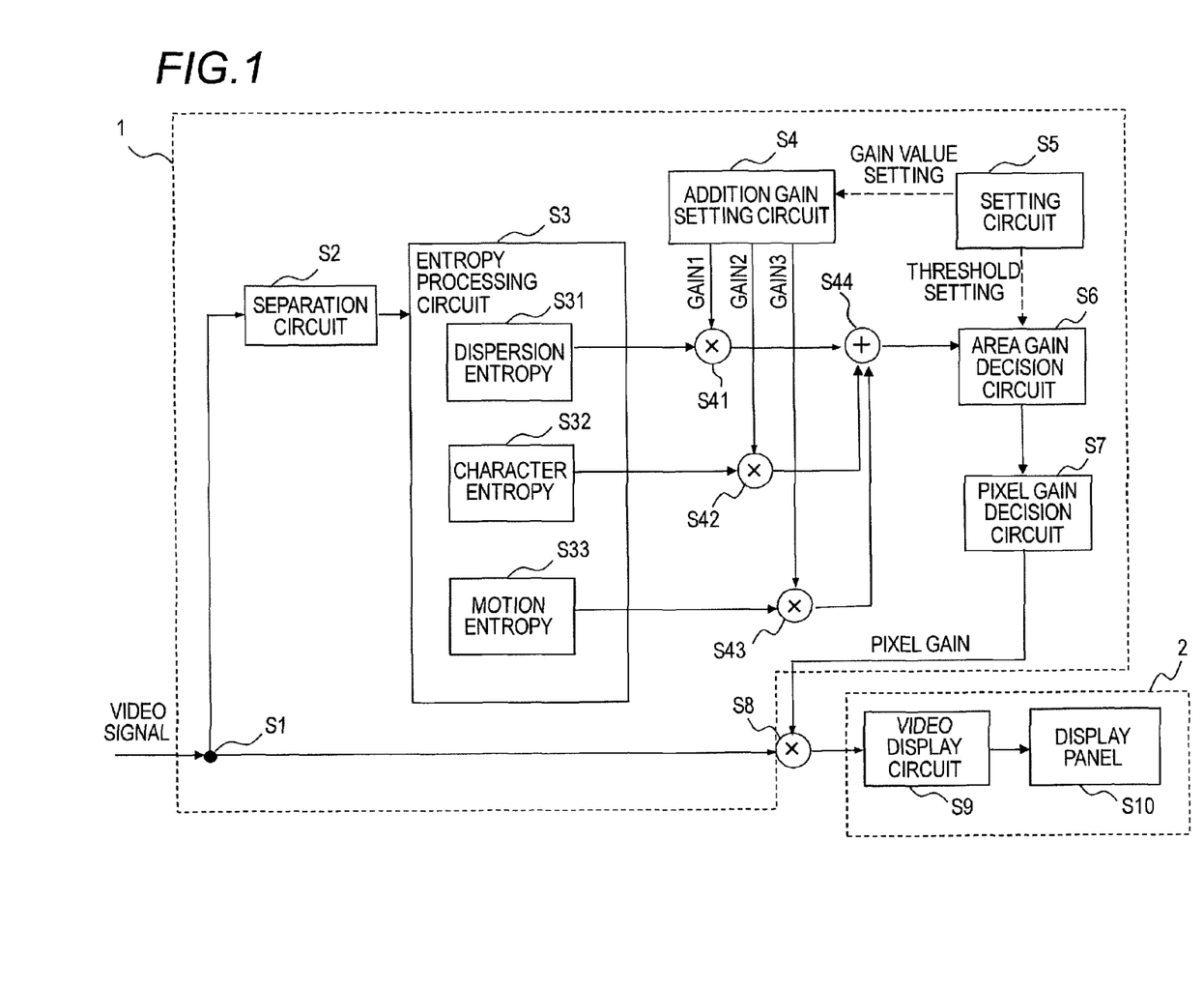
FIG. 1 is a block diagram depicting a configuration of an image processing apparatus and a display unit.

FIG. 1 is a block diagram depicting an overview of a configuration of the image display apparatus. The image display apparatus is comprised of an image processing apparatus 1 for controlling brightness of an image, and a display unit 2 for displaying an image after brightness is controlled, which is output from the image processing apparatus 1.

Image data of each frame is input to the image processing apparatus 1 as video signals S1. A separation circuit S2 separates the input image into a plurality of detection areas, and outputs an image of each detection area to an entropy processing circuit S3.

The entropy processing circuit S3 calculates entropy from the image in each detection area. Depending on the information to focus on, various entropies of the image can be represented by numeric values. Here it is assumed that a dispersion entropy calculation section S31 represents dispersion of brightness in the detection area by a numeric value as entropy on distribution of luminosity. In other words, it is regarded that as an in-plane change of brightness in an area becomes greater, the area includes more information. A character entropy calculation section S32 represents a ratio of a surface area of a character portion to a total surface area of the detection area by a numeric value as entropy on character quantity. In other words, it is regarded that as the ratio of the character portion in an area becomes greater, the area includes more information. A motion entropy calculation section S33 represents a difference of brightness between frames which continue in time by a numeric value as entropy on motion quantity. In other words, it is regarded that as motion in an area becomes greater, the area includes more information.

A plurality of entropy values, which are output from the entropy processing circuit S3, are multiplied by a gain (weight), provided by an addition gain setting circuit S4, in multipliers S41, S42 and S43, then the results are added in an adder S44. By this weighted summation, entropy of each detection area is determined.

A value of the gains 1 to 3 by which each entropy is multiplied can be arbitrarily set. If a value of the gain is set to "0", the entropy can be ignored. It is preferable that a setting circuit S5 can change the values of the gains 1 to 3. The setting circuit S5 can change the gain according to the user' setting, or can adaptively change the gain automatically discerning the type, scene, brightness level and the like of the image. A possible example of the former gain control is that selecting a display mode is enabled, so as to increase the gain of a dispersion entropy if a movie mode is selected, to increase the gain of the character entropy if a new mode is selected, and to increase the gain of the motion entropy if a sports mode is selected. A possible example of the latter gain control is that the gain of the motion entropy is increased in a case of an intense scene motion, and the gain of the character entropy is increased in the case of a new program and data broadcasting.

An area gain decision circuit S6 determines a value of an average gain by which an image of each detection area is multiplied, based on the amount of each detection area. At this time, a gain value of a detection area of which entropy is smaller is set to be greater than that of a detection area of which entropy is larger. In order to smooth a change of gain values among areas, a pixel gain decision circuit S7 performs a smoothing processing on the average gain values and determines a gain value of each pixel. The brightness of an image is controlled by a multiplier S8 multiplying each pixel of the input image by this gain. The gain values are in a 0 to 1 range, and brightness reduces as the gain value decreases. A reduction rate of brightness is given by a "1–gain value" or "(1–gain value)×100[%]".

The image which is output from the image processing apparatus 1 is input to a video display circuit S9 of a display unit 2. Based on image signals which are input, the video display circuit S9 generates a drive signal for driving a display panel S10, and outputs the drive signal to the display panel S10. Thereby the image after the brightness control is displayed on the display panel S10.

In this configuration, the separation circuit S2 corresponds to the separation unit of the present invention, the block constituted by the symbols S3, S4 and S41 to S44 corresponds to the entropy calculation unit of the present invention, and the block constituted by the symbols S6 to S8 corresponds to the brightness control unit of the present invention. The setting circuit S5 corresponds to the setting unit of the present invention.

Example 1

An embodiment when a gain is controlled based on entropy calculated by the dispersion entropy calculation section S31 will be described as Example 1. In Example 1, the functions of the character entropy calculation section S32 and the motion entropy calculation section S33 in FIG. 1 are not used.

Figure 2:
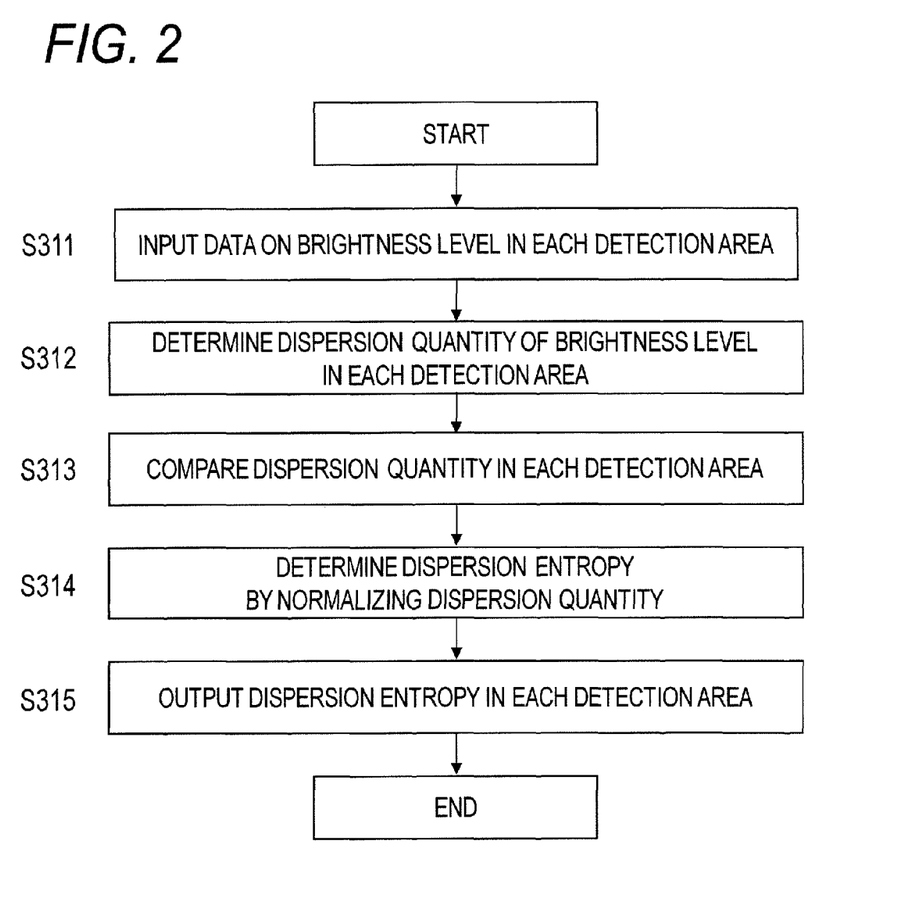
FIG. 2 is a flow chart showing an operation flow of a dispersion entropy calculation section.

FIG. 2 shows an operation flow of the dispersion entropy calculation section S31. Data on a brightness level of an image in each detection area is input from the separation circuit S2 to the dispersion entropy calculation section S31 (S311). The dispersion entropy calculation section S31 determines the dispersion quantity value (e.g. standard deviation or variance) of the brightness level in each detection area in data within a same frame (S312). If the dispersion quantity values of all the detection areas are determined, the dispersion entropy calculation section S31 compares the dispersion quantity value in each detection area (S313). Then the dispersion entropy calculation section S31 normalizes the dispersion quantity value in each detection area so that the maximum value of the dispersion quantity becomes 100 (S314). The data in each detection area represented by a numeric value like this is output as the "dispersion entropy" (S315). The above is the operation flow of the dispersion entropy calculation section S31.

An example of numeric representation of the dispersion entropy will be described with reference to FIG. 3A to FIG. 3E.

Figure 3A:
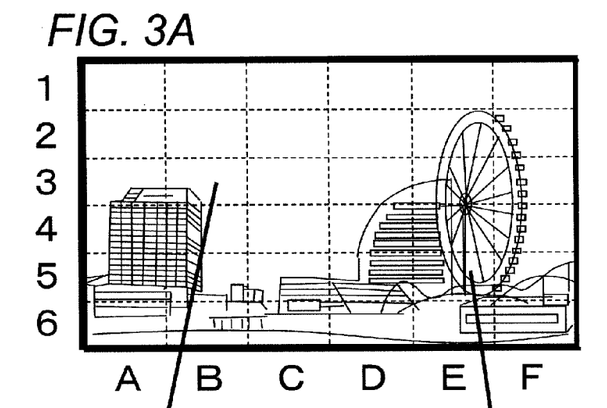
FIG. 3A to FIG. 3E show an example of numeric representation of dispersion entropy.
Figure 3B:
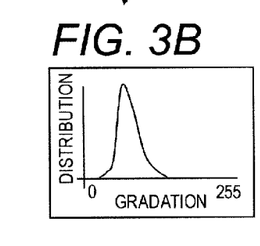
Figure 3C:
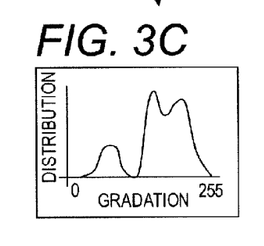

As FIG. 3A shows, one image frame is separated into vertically 6×horizontally 6=36 detection areas (sub-images) by the separation circuit S2. Hereafter the vertical addresses are indicated as 1 to 6, and the horizontal addresses are indicated as A to F. The dispersion entropy calculation section S31 calculates a histogram in the brightness level (gradation level) for each of the 36 separated areas, and determines a standard deviation as the dispersion quantity thereof. For example, in a case of an image portion of which change is small, as shown in area 3-B, the dispersion of the brightness is small, as shown in FIG. 3B. In a case of an image portion of which change is large, as shown in an area 5-E, the dispersion of the brightness is large, as shown in FIG. 3C. Generally it is highly possible that a portion of which dispersion of brightness is small (e.g. background) is not very critical in an image, and in a critical portion in an image, on the other hand, objects, characters, edges or the like are included, where a change of brightness tends to be large.

Figure 3D:
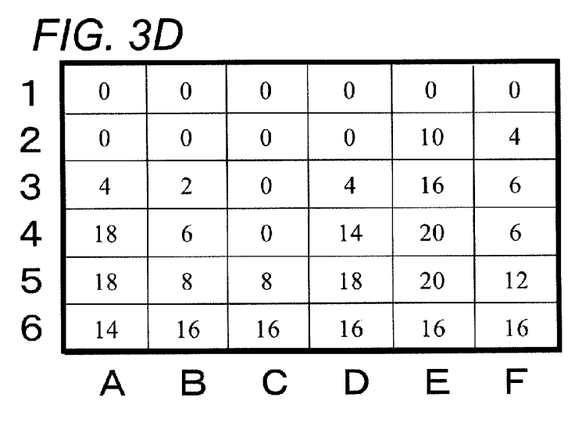
Figure 3E:
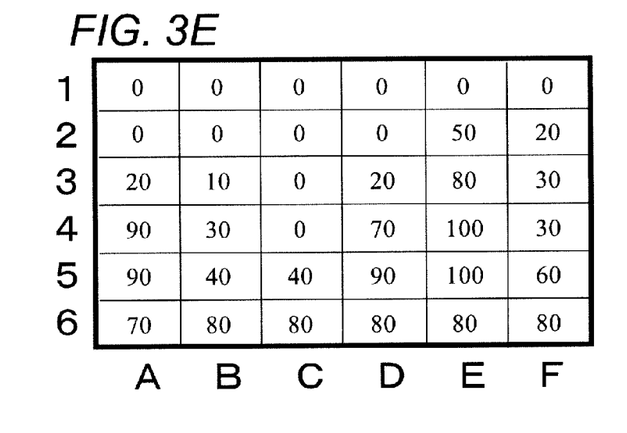

FIG. 3D shows a standard deviation of the brightness distribution in each detection area. The dispersion entropy calculation section S31 normalizes the values of the standard deviation so that the maximum value becomes 100. In this example, the standard deviation "20" in the area 4-E and the area 5-E is the maximum value, therefore the value of the dispersion entropy is determined by multiplying all the values by 5 (=100/20). FIG. 3E shows an example of the calculated dispersion entropy values.

The entropy calculated by the dispersion entropy calculation section S31 is weighted using a gain (weight) provided by the addition gain setting circuit S4 and added with entropy values calculated in other calculation sections S32 and S33. In this example, gain 1 is set to "1", and gains 2 and 3 are set to "0", and the value of entropy calculated by the dispersion entropy calculation section S31 is directly output to the area gain decision circuit S6.

Figure 4:
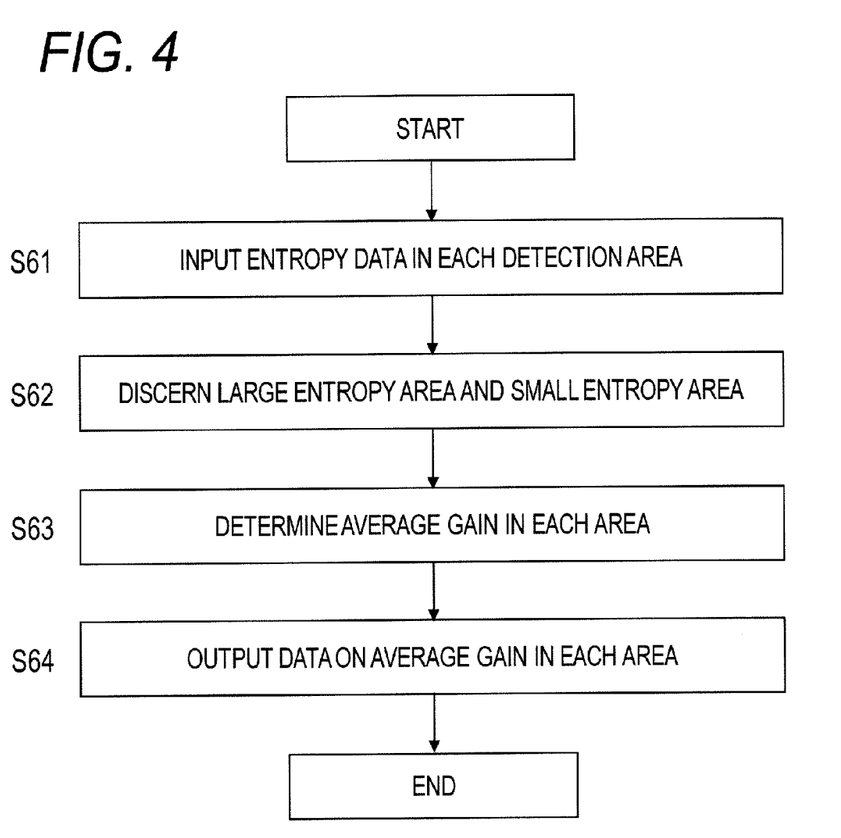
FIG. 4 is a flow chart showing an operation flow of an area gain decision circuit.

FIG. 4 shows an operation flow of the area gain decision circuit S6. The area gain decision circuit S6 inputs data on the entropy in each detection area (S61). By comparing with a predetermined threshold provided by the setting circuit S5, the area gain decision circuit S6 determines a detection area of which entropy is large (area in which brightness is not reduced), and a detection area of which entropy is small (area in which brightness is reduced) (S62). Then the area gain decision circuit S6 determines an average gain for each detection area based on the entropy and array of the detection areas (S63). At this time, the area gain decision circuit S6 determines a reduction rate (gain) of brightness in a detection of which entropy is small, so that the reduction rate gradually increases (that is, so that the gain decreases) as the distance from a detection area of which entropy is large increases. The data on the determined average gain is output to the pixel gain decision circuit S7.

Figure 5A:
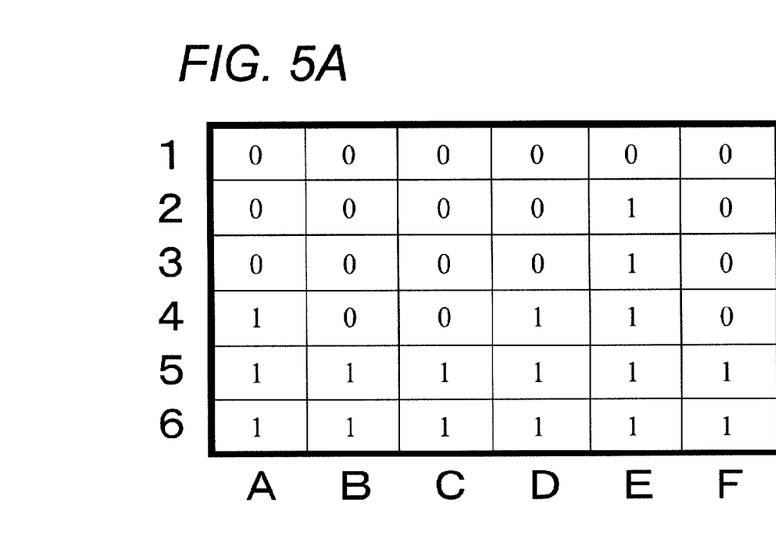
FIG. 5A and FIG. 5B show an example of area gain calculation.
Figure 5B:
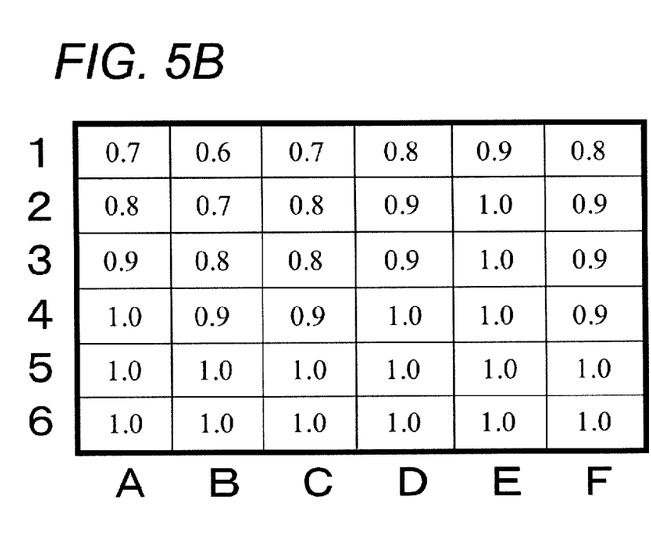

An example of calculating an average gain in each detection area will be described with reference to FIG. 5A and FIG. 5B. FIG. 5A and FIG. 5B show a calculation example under a condition that the brightness in a detection area of which entropy value is a threshold or less is decreased. Here the threshold is "30". If FIG. 3E is binarized regarding areas of which entropy is "30" or less as "0", and areas of which entropy is more than "30" as "1", the map in FIG. 5A is obtained. In this map, an area ("1" portion) in which the brightness is not reduced and an area ("0" portion) in which brightness is reduced, are separated.

FIG. 5B is an example of average gains (also called area gains) which are set based on the map in FIG. 5A. First a gain for an area where brightness is not reduced (portions indicated by "1" in FIG. 5A) is set to "1.0". Then a gain for an area adjacent to the area of which gain is "1.0" (excluding an area of which gain is already set) is set to "0.9". In the same manner, a gain for an area adjacent to the area of which gain is "0.9", is set to "0.8". A gain for an area adjacent to the area of which gain is "0.8" is set to "0.7", and a gain for an area adjacent to the area of which gain is "0.7" is set to "0.6". As a result, an average gain value is determined for all the areas, as shown in FIG. 5B.

Then the average gain values are smoothed by the pixel gain decision circuit S7 in FIG. 1, so as to determine a gain by which a value in each pixel is multiplied. The multiplier S8 multiplies a video signal S1 which is input by a pixel gain, so as to generate a brightness-controlled video signal. This video signal is displayed on the display panel S10 via the video display circuit S9.

According to this example, power consumption required for displaying an image can be reduced to about 90%, by performing the above mentioned brightness control processing. Furthermore, loss of a critical portion in an image can be sufficiently suppressed mainly by reducing brightness in an area of which entropy is small. By setting the area gains and pixel gains so that the reduction rate of brightness gradually changes, a change in the impression of the entire image can be sufficiently suppressed. As a result, an image having similar quality and similar information as a case of not taking power saving measures can be displayed, while reducing power consumption required for the display.

It is preferable that the threshold can be changed by a setting circuit S5. The setting circuit S5 may change the threshold according to user' setting, or can adaptively change the threshold by automatically discerning the type, scene, brightness level and the like of the image. Possible examples of the former case are a method of setting an appropriate threshold according to a selected display mode, and a method of having the user specify the threshold or the brightness reduction level. A possible example of the latter case is increasing the threshold in the case of a brightness image (e.g. in the case of an image of which APL (average brightness level) is high).

Example 2

An embodiment when a gain is controlled based on entropy calculated by the character entropy calculation section S32 will be described as Example 2. In Example 2, the functions of the dispersion entropy calculation section S31 and the motion entropy calculation section S33 in FIG. 1 are not used.

Figure 6:
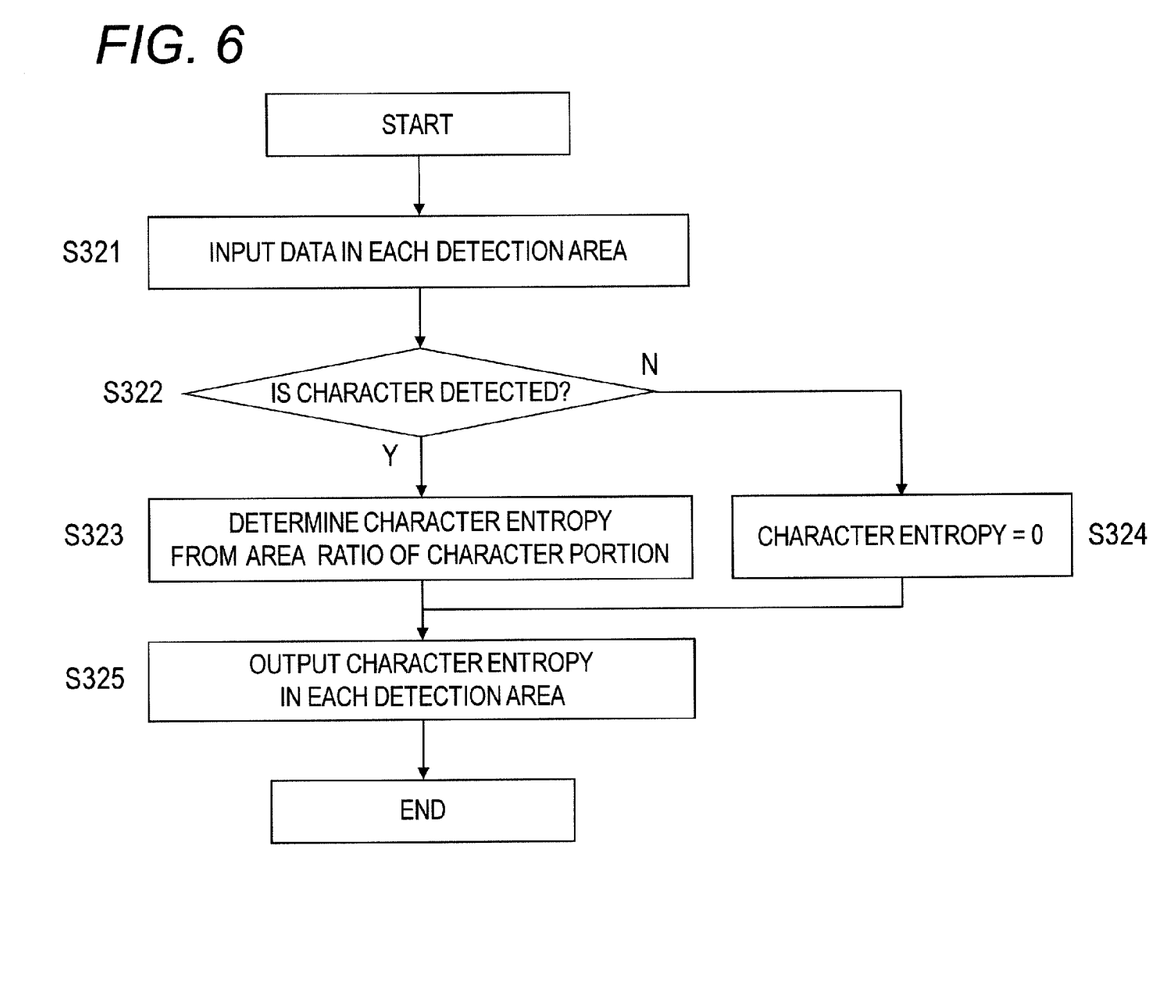
FIG. 6 is a flow chart showing an operation flow of a character entropy calculation section.

FIG. 6 shows an operation flow of the character entropy calculation section S32. Data on a brightness level of an image in each detection area is input from the separation circuit S2 to the character entropy calculation section S32 (S321). The character entropy calculation section S32 detects characters for each detection area by image analysis (S322). Detailed description on the character detection is omitted here, since a known method can be used. If characters are detected, the character entropy calculation section S32 determines a surface area of the character portion, and represents the ratio of the surface area of the character portion to the surface area of the entire detection area by numeric values (S323). According to this example, the ratio of the character portion when the surface area of the entire detection area is "100" is determined as "character entropy". If characters are not included in the detection area, the character entropy is set to "0" (S324). The character entropy calculation section S32 outputs data on the character entropy for each detection area represented by numeric values like this (S325).

An example of numeric representation of the character entropy and area gain calculation will be described with reference to FIG. 7A to FIG. 7D.

Figure 7A:
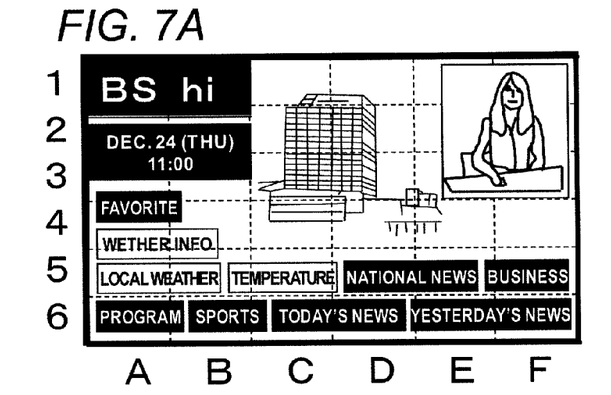
FIG. 7A to FIG. 7D show an example of numeric representation of character entropy and calculation of an area gain.
Figure 7B:
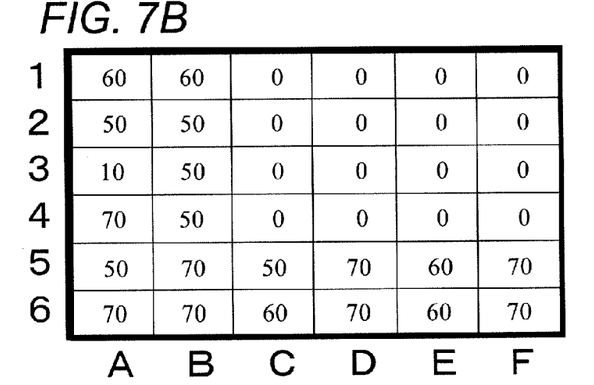
Figure 7C:
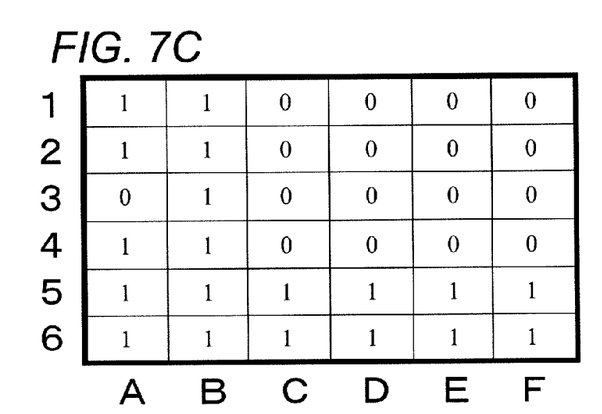
Figure 7D:
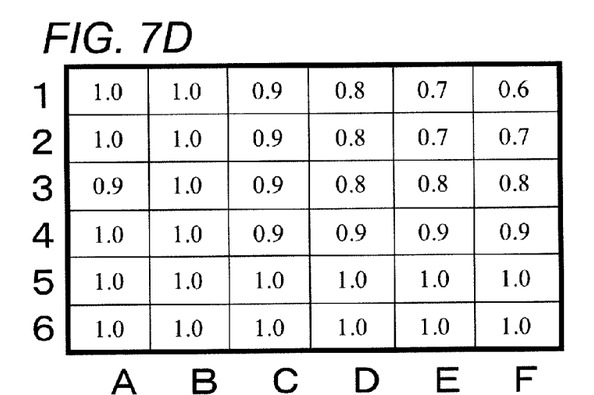

As FIG. 7A shows, one image frame is separated into 36 detection areas by the separation circuit S2. The character entropy calculation section S32 calculates a ratio of a surface area of the character portion for each area, and represents the result by numeric values, as shown in FIG. 7B, as character entropy. Just like Example 1, FIG. 7C is an example when an area in which brightness is not reduced and an area in which brightness is reduced are separated with a threshold "30". FIG. 7D is an example of area gains which are set in the same method as Example 1 based on the map in FIG. 7C.

Then the average gain values are smoothed by the pixel gain decision circuit S7 in FIG. 1, so as to determine a gain by which a value in each pixel is multiplied. The multiplier S8 multiplies a video signal S1 which is input by a pixel gain, so as to generate a brightness-controlled video signal. This video signal is displayed on the display panel S10 via the video display circuit S9.

A similar effect as Example 1 can be obtained by the brightness control processing of this example as well. The brightness control processing using the character entropy according to this example is effective for an image including lots of character information, such as a news program and data broadcasting. The brightness control processing using the character entropy according to this example is also effective for an image where character information is combined by OSD (On Screen Display). In the case of the example in FIG. 7A, power consumption required for displaying an image can be reduced to about 91%.

Example 3

An embodiment when a gain is controlled based on entropy calculated by the motion entropy calculation section S33 will be described as Example 3. The motion entropy is a time-based change of brightness, that is, a change (difference) of brightness values between frames which continue in time, obtained as entropy. In Example 3, the functions of the dispersion entropy calculation section S31 and the character entropy calculation section S32 in FIG. 1 are not used.

Figure 8:
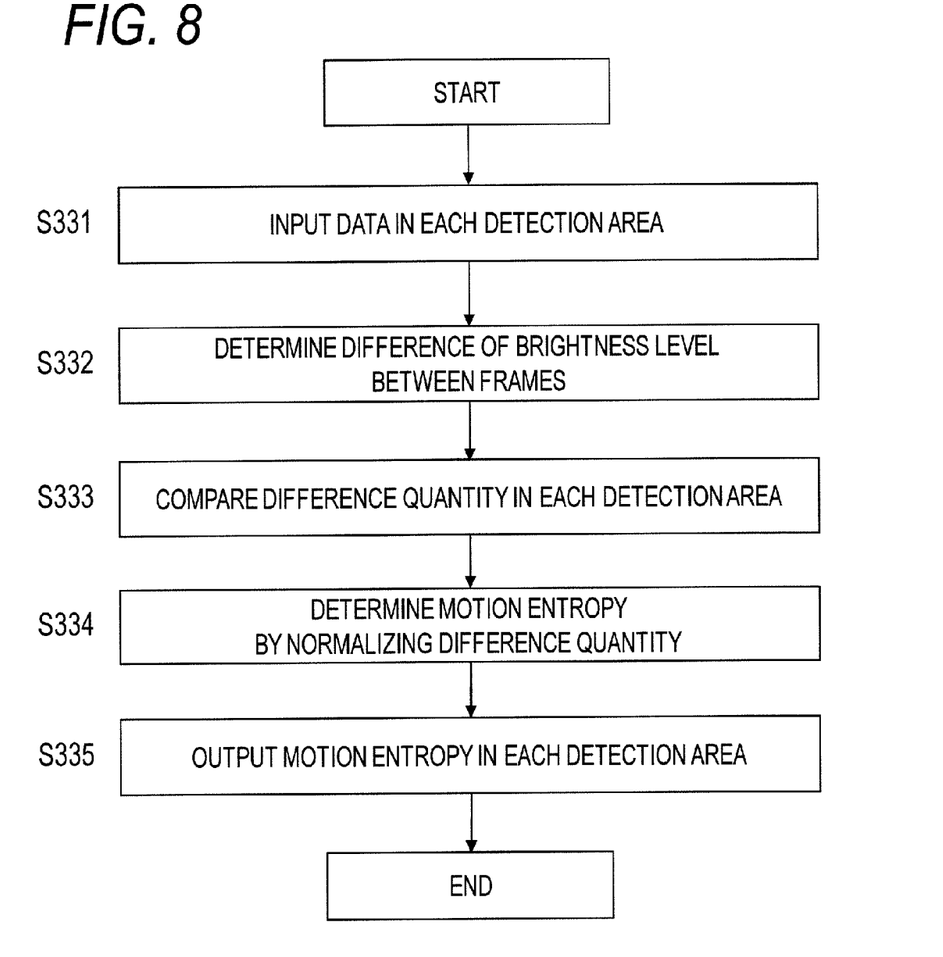
FIG. 8 is a flow chart showing an operation flow of a motion entropy calculation section.

FIG. 8 shows an operation flow of the motion entropy calculation section S33. Data on a brightness level of an image in each detection area is input from the separation circuit S2 to the motion entropy calculation section S33 (S331). The motion entropy calculation section S33 calculates a difference of brightness levels for each pixel, between two frames which continue in time, and determines an average of difference quantity values for each detection area (S332). If the average difference quantity values of brightness levels in all the detection areas are determined, the motion entropy calculation section S33 compares the average difference quantity values for each detection area (S333). The motion entropy calculation section S33 normalizes the average difference quantity value of each detection area so that the maximum value of the average difference quantity values become "100" (S334). In this way, data in each detection area, represented by a numeric value, is output as "motion entropy" (S335).

Figure 9A:
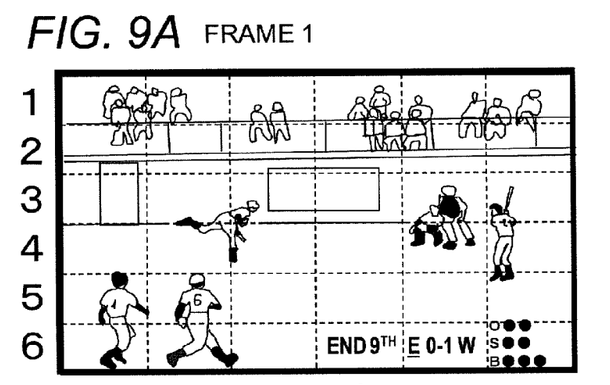
FIG. 9A to FIG. 9C show an example of numeric representation of motion entropy.
Figure 9B:
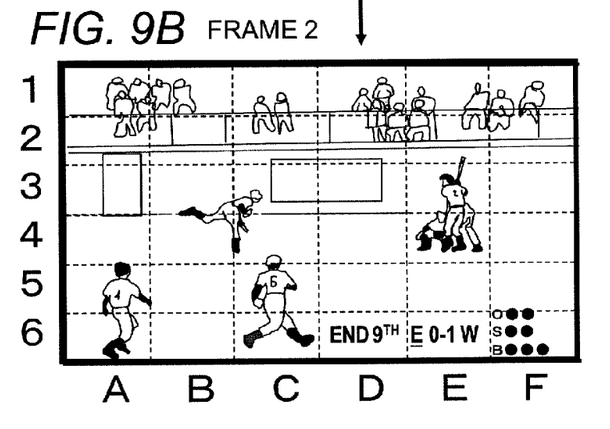
Figure 9C:
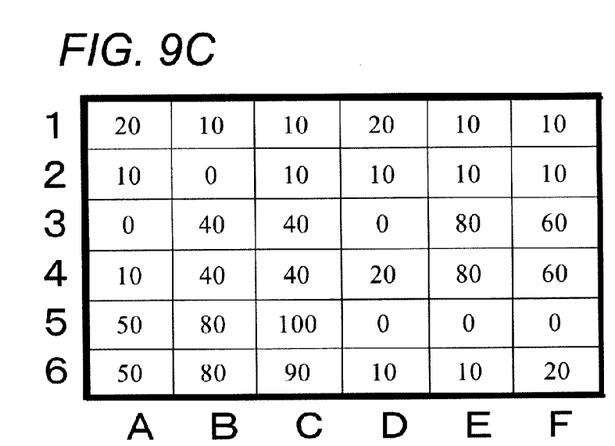
Figure 10A:
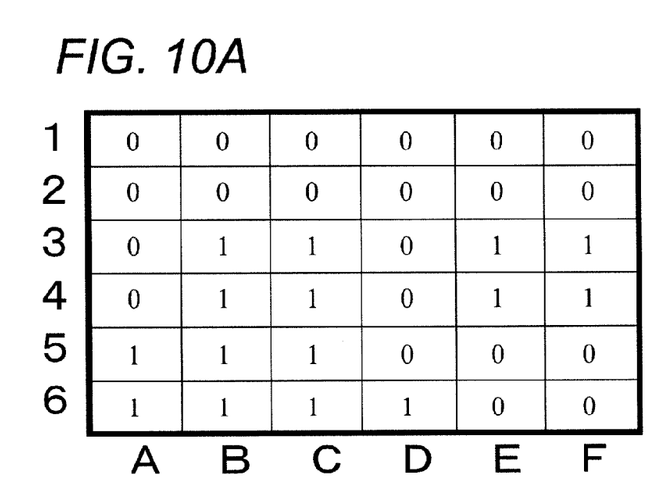
FIG. 10A and FIG. 10B show an example of area gain calculation.
Figure 10B:
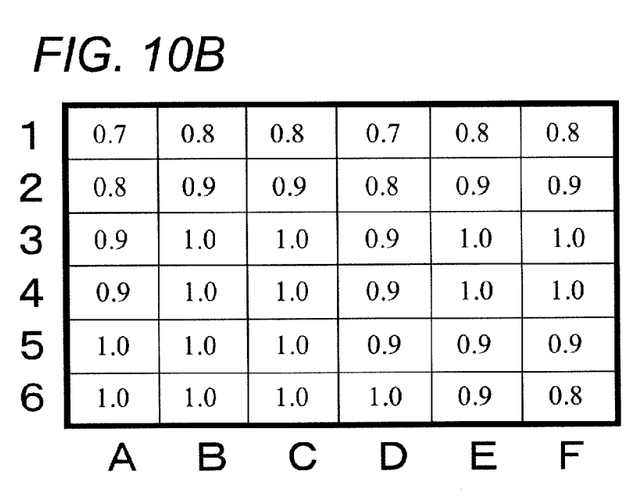

An example of numeric representation of the motion entropy will be described with reference to FIG. 9A to FIG. 9C, FIG. 10A and FIG. 10B. FIG. 9A and FIG. 9B show frames 1 and 2, which continue in time. An image of each frame is separated into 36 detection areas by the separation circuit S2. The motion entropy calculation section S33 determines an average difference quantity value for each area, and represents the results by numeric values, as shown in FIG. 9C. FIG. 10A is an example when an area in which brightness is not reduced and an area in which brightness is reduced are separated with a threshold "30" in the same manner as Example 1. FIG. 10B is an example of area gains which are set in the same manner as Example 1 based on the map in FIG. 10A.

Then the average gain values are smoothed by the pixel gain decision circuit S7 in FIG. 1, so as to determine a gain by which a value in each pixel is multiplied. The multiplier S8 multiplies a video signal S1, which is input, by a pixel gain so as to generate a brightness-controlled video signal. This video signal is displayed on the display panel S10 via the video display circuit S9.

A similar effect as Example 1 can be obtained by the brightness control processing of this example as well. The brightness control processing using the motion entropy according to this example is effective for an image including an object of which movement is major, such as a live sports broadcast. In the case of the example in FIG. 9A, power consumption required for displaying an image can be reduced to about 89%.

Example 4

Example 4 is an example of weighted summation of a plurality of entropy values. In this example, "0.6", "0.2" and "0.2" are set by the addition gain setting circuit S4 as the values of gains 1 to 3. This setting is an example of placing weight on the dispersion entropy. The ratio of these gains (weights) can be arbitrarily set as mentioned above, but may be changed by user' setting or automatically.

In a similar method as Examples 1 to 3, "dispersion entropy", "character entropy" and "motion entropy" are obtained from the entropy processing circuit S3. These entropy values are weighted using the above mentioned gains 1 to 3 and added, whereby an entropy value of each detection area is determined. The rest of the processing is the same as that described in Examples 1 to 3.

A similar effect as Example 1 can be obtained by the brightness control processing of this example as well. By combining a plurality of entropy values, as this example, an improvement in accuracy to determine a critical portion in an image can be expected.

The configuration of the present invention is not limited to the above mentioned examples, but numerous modifications can be made within the scope of the invention. For example, the types and number of entropy values to be evaluated can be arbitrarily set. The method of determining gains is not limited to the above examples. For example, in order to further reduce the power consumption, the reduction rate of brightness in an area of which entropy is small can be further increased, or brightness may be dropped somewhat even in an area of which entropy is large. Further, when gains for an area in which entropy is small are determined, values of the gains may be determined considering the value of the entropy in this area. Instead of separating an area of which entropy is large and an area of which entropy is small using one threshold, the area may be separated into three or more areas using two or more thresholds. The values of the thresholds and gains may be arbitrarily set. A number of areas to be separated may be more than 36 or less than 36. The surface area and shape of an area need not be the same for all the areas.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-110535, filed on May 12, 2010, which is hereby incorporated by reference herein in its entirety.

What is claimed is:

1. An image processing apparatus for controlling brightness of an image to be output to a display unit, comprising:
a separation unit which separates an input image into images in a plurality of areas;
an entropy calculation unit which calculates, for the image in each area, entropy information on at least one of distribution of luminosity, character quantity, and motion quantity; and
a brightness control unit which controls brightness for the image in each area so that a first reduction rate of brightness in an area of which entropy is relatively small is greater than a second reduction rate of brightness in an area of which entropy is relatively large.

2. The image processing apparatus according to claim 1, wherein
the entropy calculation unit has a plurality of calculation sections for calculating entropy values of different kinds of information, and determines the entropy in each area using the plurality of entropy values calculated by the plurality of calculation sections.

3. The image processing apparatus according to claim 2, wherein
the entropy calculation unit determines the entropy in each area by calculating a weighted sum of the plurality of entropy values calculated by the plurality of calculation sections.

4. The image processing apparatus according to claim 3, further comprising a setting unit which changes weights by which the plurality of entropy values are multiplied respectively.

5. The image processing apparatus according to claim 1, wherein
the brightness control unit determines a reduction rate of brightness in an area of which entropy is a predetermined threshold or less, so that the reduction rate gradually increases as the area is more distant from an area of which entropy is larger than the predetermined threshold.

6. The image processing apparatus according to claim 1, wherein
the brightness control unit performs smoothing processing to smooth the change in the reduction rate of brightness among areas.

7. The image processing apparatus according to claim 1, wherein
the entropy calculation unit determines a dispersion of brightness in an area as the entropy information on the distribution of luminosity.

8. The image processing apparatus according to claim 1, wherein
the entropy calculation unit determines a ratio of a surface area of a character portion to a surface area of the area as the entropy information on the character quantity.

9. The image processing apparatus according to claim 1, wherein
the entropy calculation unit determines a difference of brightness between frames which continue in time as the entropy information on the motion quantity.

10. An image processing method executed by an image processing apparatus for controlling brightness of an image to be output to a display unit, comprising the steps of:
separating an input image into images in a plurality of areas;
calculating, for the image in each area, entropy information on at least one of distribution of luminosity, character quantity, and motion quantity; and
controlling brightness for the image in each area so that a first reduction rate of brightness in an area of which entropy is relatively small is greater than a second reduction rate of brightness in an area of which entropy is relatively large.

* * * * *